United States Patent
Chiang et al.

(10) Patent No.: US 6,252,364 B1
(45) Date of Patent: Jun. 26, 2001

(54) METHOD AND APPARATUS FOR UNLATCHING AN ACTUATOR

(75) Inventors: Wing Kong Chiang; Kian Keong Ooi; Ricky Wei Watt Yeo; Jack Ming Teng; Choon Kiat Lim, all of Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/401,105

(22) Filed: Sep. 22, 1999

Related U.S. Application Data
(60) Provisional application No. 60/100,899, filed on Sep. 23, 1998.

(51) Int. Cl.$^7$ ......................................................... H02P 7/00

(52) U.S. Cl. ............................ 318/280; 318/561; 360/105

(58) Field of Search ..................................... 318/280, 632, 318/561, 254; 360/105, 75, 99.06

(56) References Cited

U.S. PATENT DOCUMENTS

| | | | | |
|---|---|---|---|---|
| 5,363,261 | * | 11/1994 | Eckberg et al. | 360/105 |
| 5,600,219 | | 2/1997 | Gomez . | |
| 5,650,891 | * | 7/1997 | Thayne et al. | 360/99.06 |
| 5,694,271 | * | 12/1997 | Stefansky | 360/105 |
| 5,805,384 | * | 9/1998 | Bronshvatch et al. | 360/105 |
| 5,825,575 | * | 10/1999 | Lee | 360/75 |

* cited by examiner

*Primary Examiner*—Paul Ip
*Assistant Examiner*—Rina I. Duda
(74) *Attorney, Agent, or Firm*—Derek J. Berger; Jonathan E. Olson; Shawn B. Dempster (57) ABSTRACT

A method and apparatus for releasing an actuator from a latched position. A voice coil motor is operably coupled to the actuator which is held by a latch in a latched position. The voice coil motor is provided with a first current signal of increasing magnitude alternating with a second current signal out of phase with the first current signal. The first current signal causes the voice coil motor to urge the actuator away from the latched position, and the second current signal causes the voice coil motor to urge the actuator towards the latched position.

20 Claims, 8 Drawing Sheets

METHOD AND APPARATUS FOR UNLATCHING AN ACTUATOR

This patent application claims priority from U.S. Provisional Application No. 60/100,899, filed Sep. 23, 1998.

FIELD OF INVENTION

The present invention relates generally to the field of disc drive storage devices, and more particularly to a method and apparatus for unlatching an actuator from a latch.

BACKGROUND OF THE INVENTION

In a disc drive system, an actuator is used to position a read/write head over data storage areas, the actuator being driven by a voice coil motor (VCM). A latch is sometimes used for holding the actuator at a latched position when, for example, the disc drive is not in operation.

To unlatch the actuator from the latch, the conventional method is to apply steps of current progressively to the VCM in the direction opposite to the latching force, until the actuator breaks away from the latch. Once it is unlatched, the actuator would tend to move to the other extremity of its range of travel, and may even crash into an outer crash stop. This is undesirable as it introduces shocks and risks damage to the read/write head and the data storage areas.

One method of restraining the motion of the actuator is described in the U.S. Pat. No. 5,600,219 to Kevin A. Gomez granted Feb. 4, 1997 for "Sensorless Closed-Loop Actuator Unlatch". Through monitoring the slope of the back EMF (electromagnetic force) of the VCM, the actuator unlatch controller is able to determine when the actuator has broken free of the latch, at which point the actuator latch controller would cause the current signal to the voice coil motor to be cut off.

As the requirement for shock-resistance is pushed higher, it has resulted in an increase in the latching force with which the actuator is held at the latched position. Accordingly, the current to the VCM has to increase to a higher and higher level in order to unlatch the actuator. However, the problem of the actuator accelerating beyond control upon release is aggravated as the current to the VCM is increased. Cutting off the current to the VCM once the actuator is unlatched does not provide an adequate solution to the problem. It follows that there is a need for an improved method of unlatching the actuator.

The present invention not only provides an improved method and apparatus for unlatching the actuator suitable for use with disc drive systems with large latching forces, it also provides a faster method of unlatching the actuator. It will be evident from the following description that the present invention offers other advantages over the prior art.

SUMMARY OF THE INVENTION

According to one aspect of the invention, there is provided an apparatus for releasing an actuator from a latched position. The apparatus comprises a voice coil motor operably coupled to an actuator, a latch for holding the actuator at a latched position, and an unlatching mechanism which is configured to energize the voice coil motor with a first current signal of increasing magnitude alternating with a second current signal.

According to another aspect of the invention, there is provided a method of releasing an actuator from a latched position. The method comprises steps of energizing the voice coil motor with a first current signal of increasing magnitude alternating with a second current signal that is out of phase to the first current signal. The first current signal causes the voice coil motor to urge the actuator away from the latched position, and the second current signal causes the voice coil motor to urge the actuator towards the latched position. In the preferred embodiment, the phase difference is 180 degrees.

It is found that not only does the present invention requires much less current, and the time required to unlatch the actuator is also significantly less, as compared with the prior art.

In a preferred embodiment, the magnitude and frequency of the first current signal and of the second current signal may be varied to obtain a release of the actuator from the latch in as short a time as possible, using as little current as possible, for different actuator systems which have different mechanical resonance characteristics. Furthermore, the second current signal may be clipped to minimise the current used.

Preferably, the first current is cut off from the VCM when it is determined that the actuator has been released from the latched position. The present invention is applicable in systems where that is determined from the back EMF of the VCM as well as in systems where that is determined from the Gray code.

DETAILED DESCRIPTION

A preferred embodiment of the present invention is described with reference to the drawings.

Figure 1:
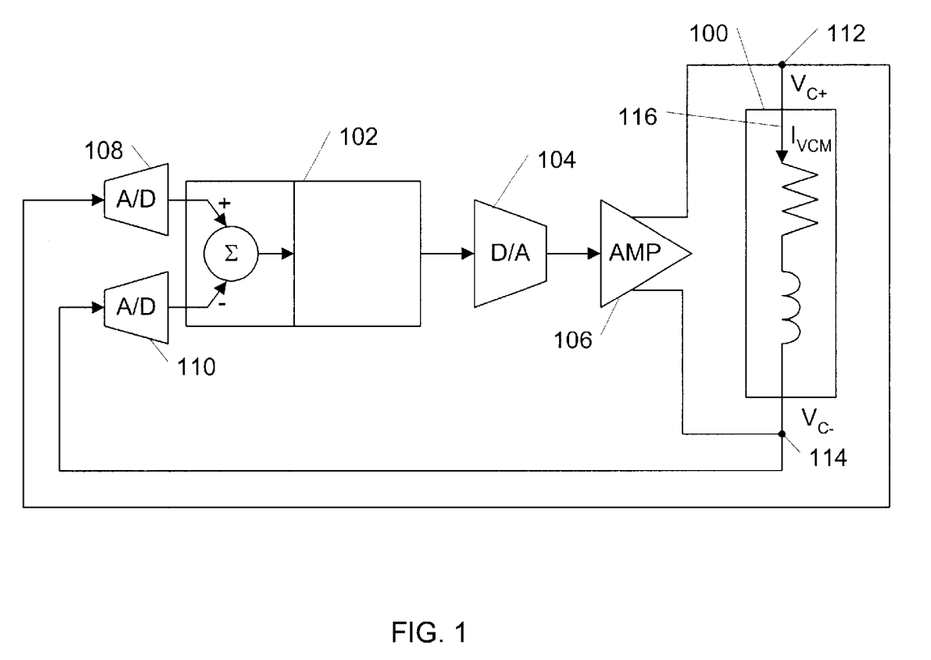
FIG. 1 is a functional block diagram of a VCM system with a feedback loop for reading the back EMF of the VCM.

When a disc drive is deactivated, the actuator is held in a latched position by a latch. The movement of the actuator is controlled by a VCM. FIG. 1 shows a functional block diagram of a VCM 100 as applied in a preferred embodiment the present invention. A current signal $I_{VCM}$ 112 provided to the VCM 100 produces an angular torque by interacting with the magnetic field in the VCM 100. The direction of this resultant angular torque can be acting on the actuator to urge it towards or away from the latched position, depending on the direction of the current signal 112 into the VCM 100.

The magnitude of the VCM current signal 112 is computed by the actuator unlatch controller 102 and the digital command will be sent to the VCM command digital-analog converter (DAC) 104. The VCM command DAC 104 converts the digital command into a voltage command that is proportional to the digital command. The power amplifier 106 converts the voltage command from the VCM command DAC 104 to a current command that is required by the VCM 100 to move the actuator. The back EMF across the two ends of the VCM ($V_{C+}$ 112 and $V_{C-}$ 114) is fed back to two analog-digital converters (ADCs) 108 and 110, and converted to digital representation. The back EMF is calculated by taking the difference of the digitized back EMF values. The actuator unlatch controller 102 will check the acceleration of the actuator based on the rate of change of the back EMF from the back EMF samples to decide whether the actuator has been released from the latched position.

The back EMF is given by equation (1) as shown below:

$$B_{emf} = K_i * \theta \quad (1)$$

where $B_{emf}$ is the back EMP in V $K_i$ is the angular torque constant in V/rad·s$^1$ $\theta$ is the angular velocity in rad·s$^{-1}$ The back EMF at time $t_0$ is given by equation (2) as follows:

$$B_{emf}(t_0) = K_i * \theta(t_0) \quad (2)$$

The back EMF at time $t_1$ is given by:

$$B_{emf}(t_i) = K_i * \theta(t_1) \quad (3)$$

$$(3)-(2) => B_{emf}(t_1) - B_{emf}(t_0) = K_i * [\theta(t_1) - \theta(t_0)] \quad (4)$$

Divide (4) by $\delta t =>$ $$\frac{B_{emf}(t_1) - B_{emf}(t_0)}{\delta t} = K_i * \frac{[\theta(t_1) - \theta(t_0)]}{\delta t} \quad (5)$$

Rewriting equation (5) gives the rate of change of back EMF in term of the angular acceleration:

$$\frac{d(B_{emf})}{dt} = Ki * \ddot{\theta} \quad (6)$$

where $\theta$ is the angular acceleration in rad·s$^{-2}$

From equation (6), the acceleration of the actuator is proportional to the rate of change of the back EMF across the VCM and the actual acceleration of the actuator can be calculated since the angular torque constant of the actuator is known.

Figure 2:
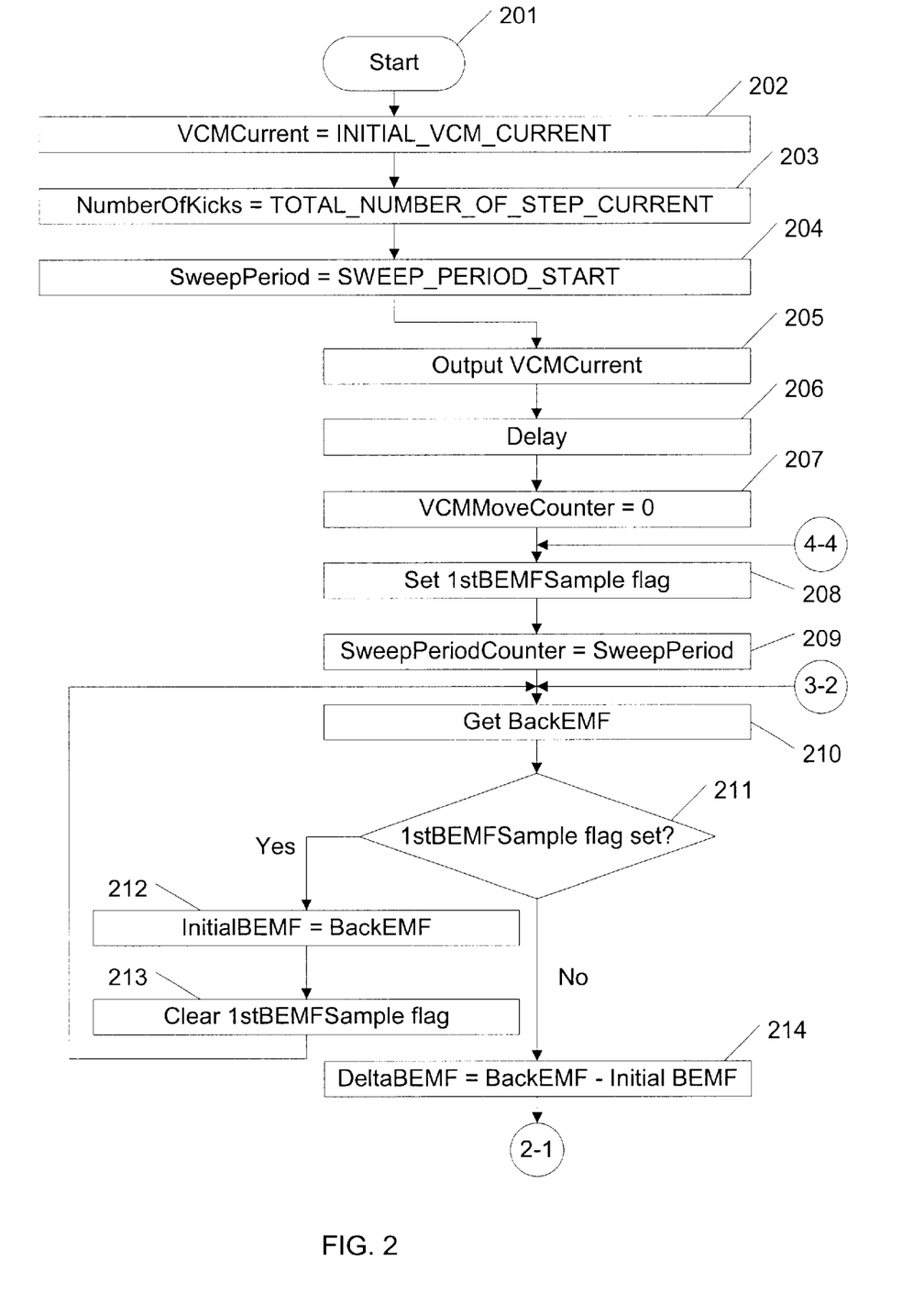
FIGS. 2 to 4 show a flow diagram for a method of unlatching the actuator according to a preferred embodiment of the invention.

With reference to FIG. 2, the unlatching process is initiated at 201. The actuator unlatch controller will begin with initializing the variable VCMCurrent with an initial current value 202 for the VCM COMMAND DAC. The initial current signal is chosen to produce a resultant torque which is slightly less than but not too far from the latch strength and in the direction which produces a torque away from the latch. The counter NumberOfKicks is initialized with the total number of current steps 203 to be taken. This counter is used to keep track of the actual number of steps taken to unlatch the actuator arm. The SweepPeriod counter is initialized with the initial period that is the number of back EMF samples to be taken 204 for the current step duration. Therefore, the frequency of the VCM current signal is simply controlled by changing the number of back EMF samples to be taken for a particular cycle. The variable VCMCurrent is sent out to the VCM COMMAND DAC 205 to drive an equivalent current signal into the VCM. Since the current signal injected into the VCM is a step current signal, a suitable delay 206 is required for the transient of the VCM current signal to settle. The counter VCMMoveCounter is initialized to zero 207, this counter is used later on in the flow to determine whether the actuator has broken free from the latch.

The 1stBEMFSample flag is set 208 to indicate the coming back EMF sample is the first sample of each new current step. The SweepPeriodCounter counter is updated with the value in the SweepPeriod counter 209.

The back EMF across the VCM is obtained 210 and stored into the BackEMF variable. To determine if it is the first back EMF sample, the 1stBEMFSample flag is checked 211. If it is the first back EMF sample, the InitialBEMF is set to be equal to the value in BackEMF 212. The 1stBEMFSample flag is cleared 213 to indicate the first back EMF sample has been obtained. The operation continues by getting back to get the back EMF across the VCM again 210.

Figure 3:
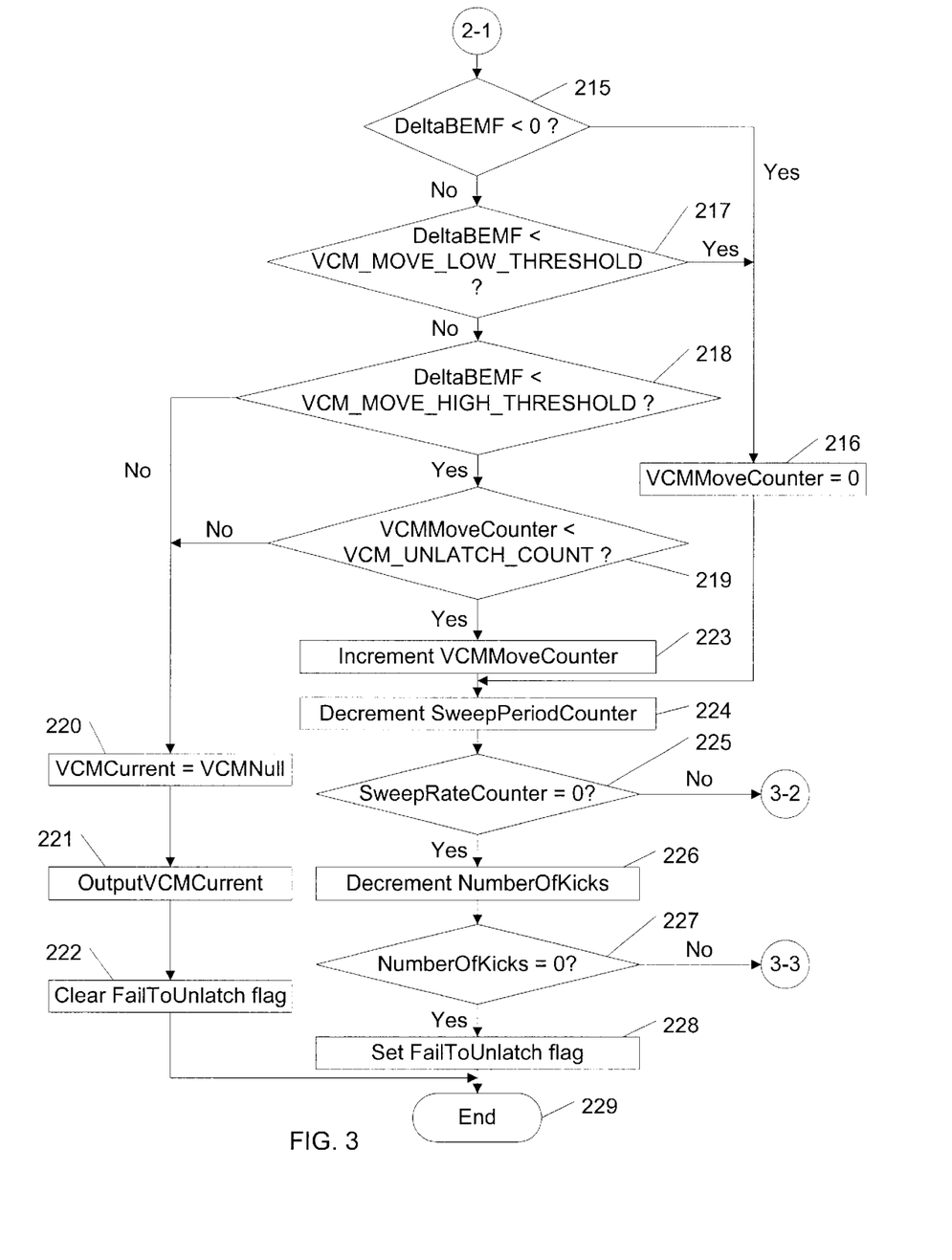

If it is not the first back EMF sample, the DeltaBEMF variable is computed by taking the difference between the BackEMF variable and the InitialBEMF variable 214. FIG. 3 shows where the DeltaBEMF variable is checked to see if it is negative 215. If it is negative, it means that the actuator has not moved and the VCMMoveCounter is reset to zero 216. Otherwise, the DeltaBEMF variable is checked to see if it is less than the lower threshold of actuator move limit 217. If that is the case, it means that the actuator has not moved and the VCMMoveCounter is again reset to zero 216. After resetting the VCMMoveCounter, the operation will proceed to decrement the SweepPeriodCounter by one 224. On the contrary, if the DeltaBEMF variable is greater than or equal to the lower threshold of the actuator move limit 217, it means that the actuator is beginning to move.

The DeltaBEMF variable is checked to see if it is less than the upper threshold of actuator move limit 218. If that is the case, it means that the velocity of the actuator is not too high and that the actuator is still in the process of overcoming the magnetic force of the latch. The VCMMoveCounter is checked to see if it is greater than or equals to the VCM unlatch count 219. If the VCMMoveCounter is greater than or equals to the VCM unlatch count, it means that the actuator has overcome the magnetic force of the latch. If the DeltaBEMF variable is greater than or equal to the upper threshold of actuator move limit 218, it means that the velocity of the actuator is high and that it is no longer under the influence of the latch force of the latch. Since the actuator has overcome the latch force, the VCMCurrent variable is set to null current 220. The FailToUnlatch flag is cleared 222 to indicate that the actuator has been successfully released from the latched position before proceeding to end the unlatch process 229.

However, if the VCMMoveCounter is less than the VCM unlatch count, it means that the actuator is still under the influence of the latch force. The VCMMoveCounter is incremented by one 223.

The get back EMF loop is adjusted by decrementing the SweepPeriodCounter by one 224. The SweepPeriodCounter is tested to see if it has reached zero 225. The process is repeated by looping back to see if it has reached zero 225. The process is repeated by looping back to get the back EMF value 210 if the SweepPeriodCounter has not reached zero. Otherwise, the NumberOfKicks counter is decremented by one 226 to indicate that one additional current step has been performed in the closed loop AC unlatch process. The NumberOfKicks counter is tested to see if it has reached zero 227. If the NumberOfKicks counter has been decremented till zero, the FailToUnlatch flag is set 228 to indicate that the unlatching process is not successful in pushing actuator away from the latched position after the maximum allowable number of current steps before proceeding to end the unlatching process 229.

Figure 4:
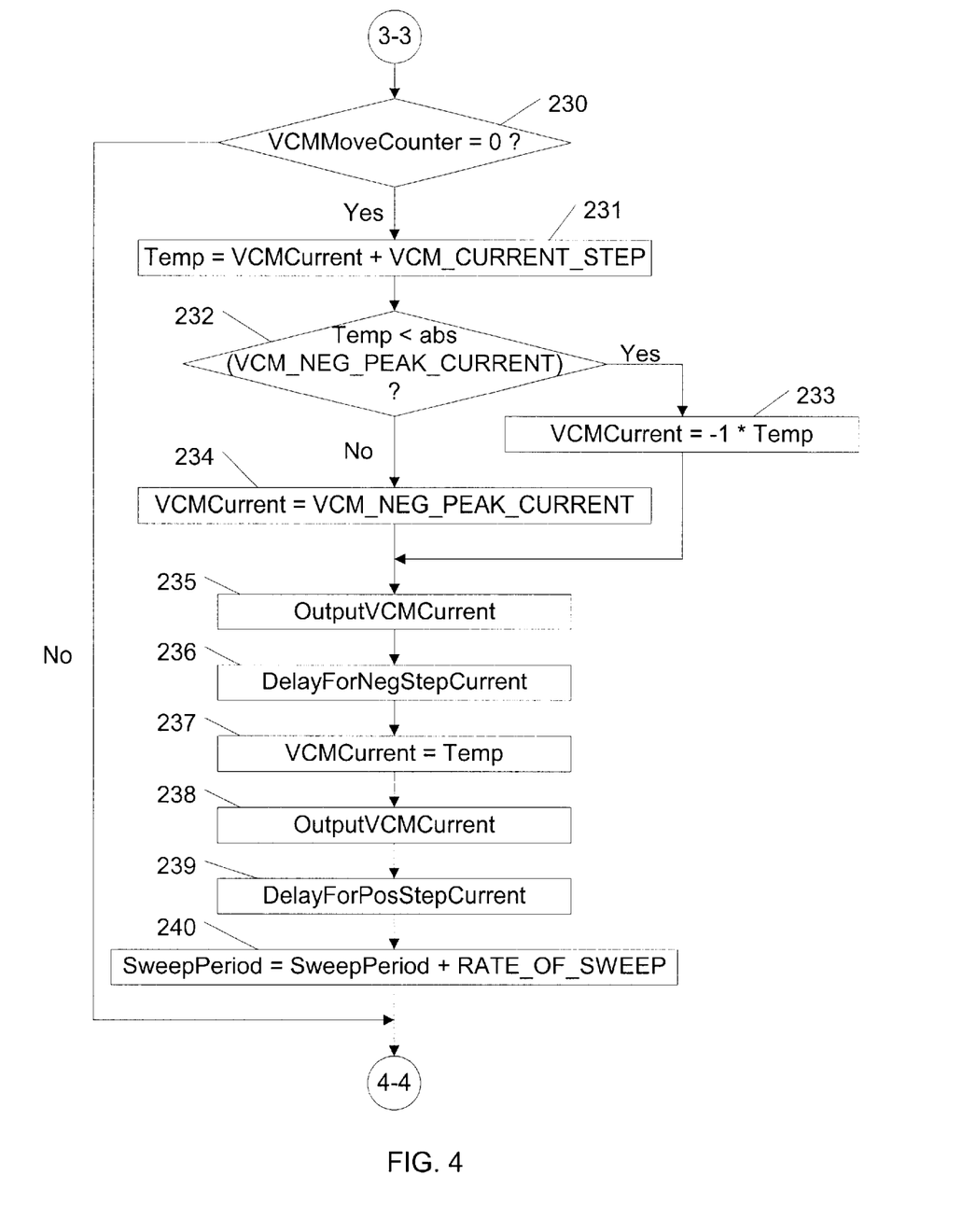

However, if the NumberOfKicks counter has not expired, the VCMMoveCounter is tested against zero 230, as shown in FIG. 4. If the VCMMoveCounter is not zero, it means that the actuator is still moving away from the latch position, so the process continues further with the present first current step by looping back to the entry point where the 1st BEMFSample flag is set 208. On the contrary, if the VCMMoveCounter is zero, it means that the actuator is in a stand still at the latched position and hence, the unlatching process branches to the path to reverse the current step into the VCM.

The process of reversing the VCM current step begins with determining the magnitude of the next VCM current step. The value of the next VCMCurrent step is first stored into the Temp variable by taking the sum of the VCMCurrent variable and the size of the incremental VCM current step 231. This is the magnitude varying component of the AC unlatch current. This incremental current step should be carefully chosen to avoid too coarse current steps because this could result in excessive overshoots which leads to longer delays before the back EMF sampling could begin. Furthermore, larger current steps also results in the actuator moving at higher velocities upon release from the latched position. If the velocity of the actuator exceeds the maximum allowable velocity, the servo system may lose control of the actuator.

However, if the current steps are too fine, the actuator would need a longer time to be released from the latched position. The Temp variable is checked against the absolute magnitude of the VCM negative peak current 232. If the Temp variable is less than the absolute magnitude of the VCM negative peak current, the VCMCurrent variable is reversed by taking the product of minus one and the Temp variable 233. The process proceeds with sending out the VCMCurrent variable to the VCM COMMAND DAC 235 which in turn sends a second current into the VCM that drives the actuator towards the latch. If the Temp variable is greater than or equal to the absolute magnitude of the VCM negative peak current, the VCMCurrent variable is saturated with a reverse VCM negative peak current 234. It was experimentally verified that further increasing the reverse VCM current beyond a certain threshold does not contribute towards a shorter unlatch time. Similarly, the VCMCurrent variable will be sent to the VCM COMMAND DAC 235.

After the second current step is sent to the VCM 235, a delay 236 is required for the transient of the current step to settle. The first current step for the VCM from the Temp variable is placed back into the VCMCurrent variable 237. The forward VCM current command is sent to the VCM COMMAND DAC 238 which in turn produces a current signal into the VCM to drive the actuator arm in the direction away from the latch. Similarly, a delay 239 is required for the transient of the current step to settle. The SweepPeriod counter is increased by an incremental amount 240 to decrease the period of the sweep rate slightly. This contributes to the frequency varying component of the AC unlatch current.

Figure 5:
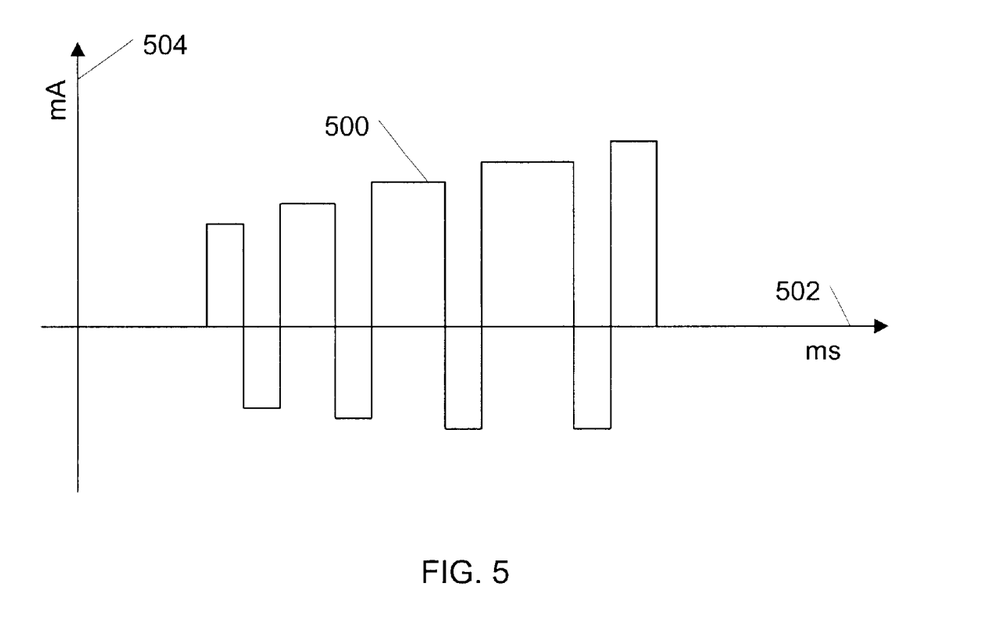
FIG. 5 illustrates the current signal into the VCM according to the process described in FIGS. 2 to 4.

The process described in FIGS. 2 to 4 has a VCM current profile 500 as shown in FIG. 5. The graph has an x-axis of time 502 and a y-axis of current 504. The first current signal increases in magnitude at varying frequency whilst the second current signal is clipped after an initial increase in magnitude.

Figure 6:
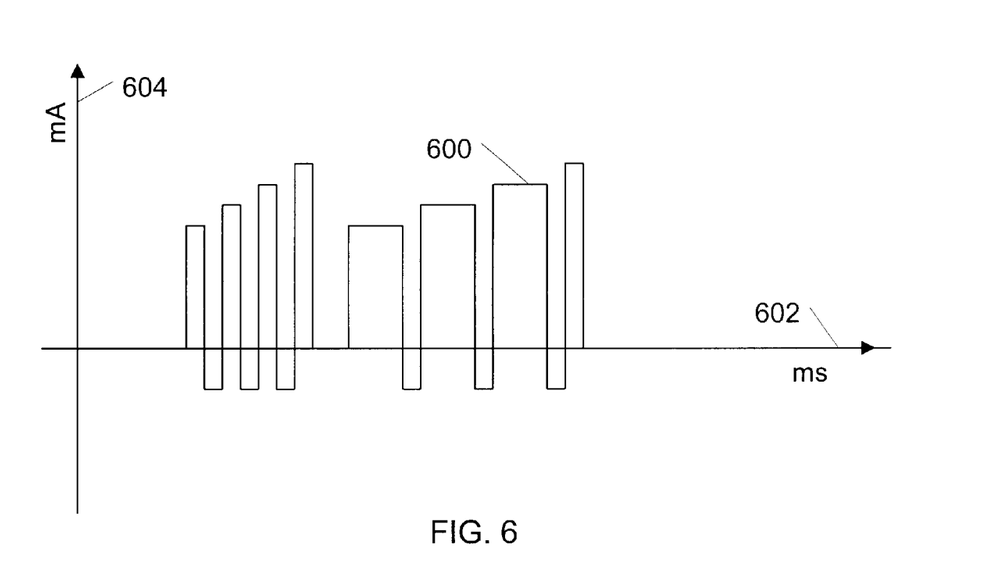
FIG. 6 illustrates the current signal into the VCM according to the another preferred embodiment of the invention.
Figure 7:
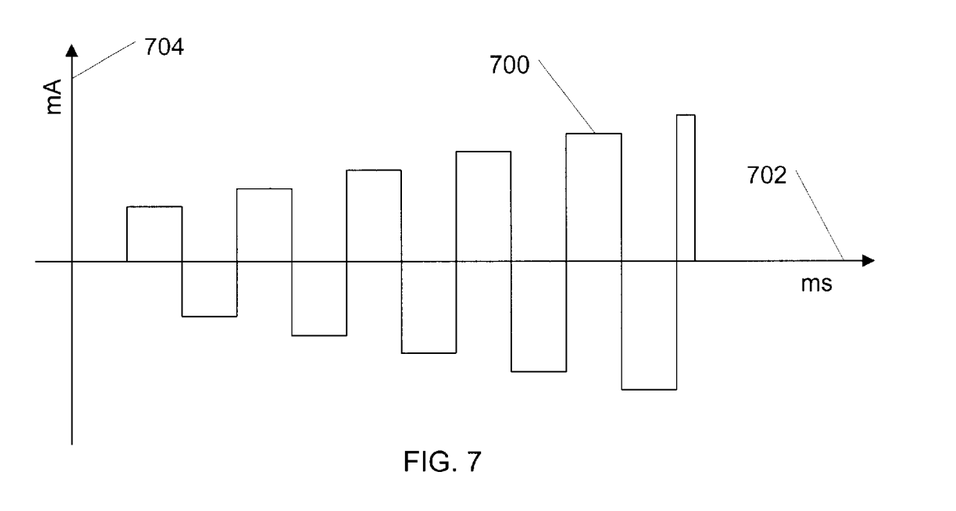
FIG. 7 shows a plot of the current signal into the VCM where the magnitude is incremented in steps until the actuator is released from the latched position.

FIG. 6 shows the VCM current profile 600 in a graph where the x-axis is time 602 and the y-axis is current 604. This illustrates another embodiment of the present invention in which the magnitude of the current signal into the VCM is incremented in steps while the frequency is held constant. If the actuator fails to unlatch when the upper limit of the first current had been applied, the process is repeated at another frequency.

FIG. 7 to FIG. 11 illustrate the VCM current profiles of different possible embodiments of the present invention. For example, the current profile 700 of FIG. 7 in the graph where the x-axis is time 702 and the y-axis is current 704 illustrates the case where the magnitudes of the first current signal and the second current signal are incremented in steps. The end of the plot shows the current being cut off as the actuator has been unlatched.

Figure 8:
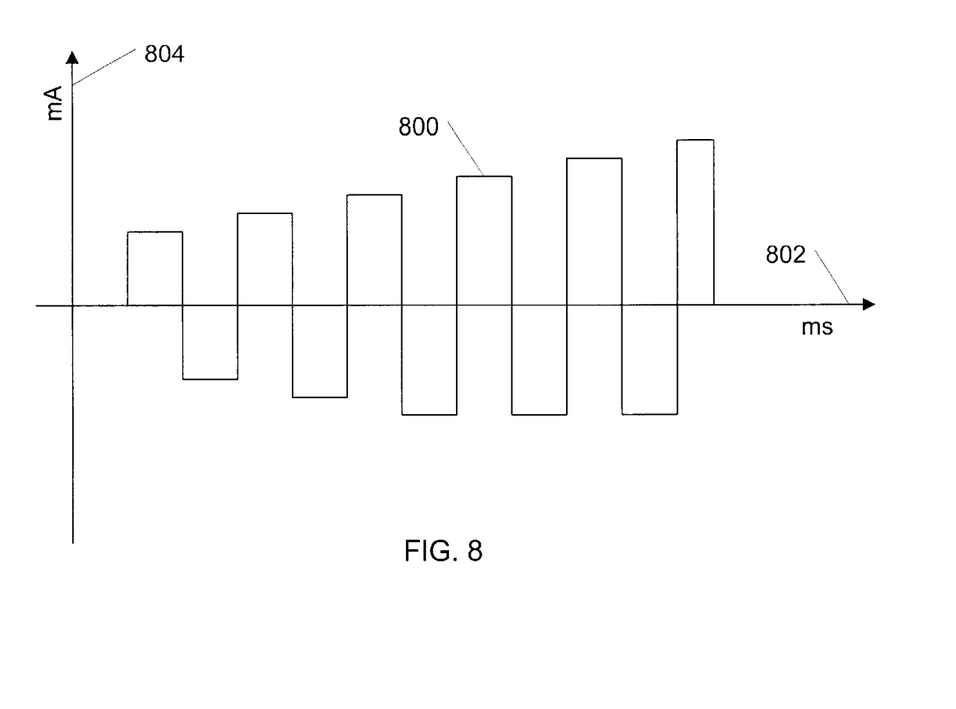
FIG. 8 illustrates a variation of the current profile as shown in FIG. 7 where the second current is subsequently clipped.

In some variations, the magnitude of the second current signal is allowed to increase from a low value until it is of sufficient strength to provide an oscillating effect on the actuator before it is clipped, as shown in FIG. 8. Again, the current profile 800 is shown against an x-axis of time 802 and a y-axis of current 804. When the magnitude of the second current signal is clipped, less current is required to produce the next first current step of the desired magnitude as compared to the case where the magnitude of the second current is allowed to increase.

Figure 9:
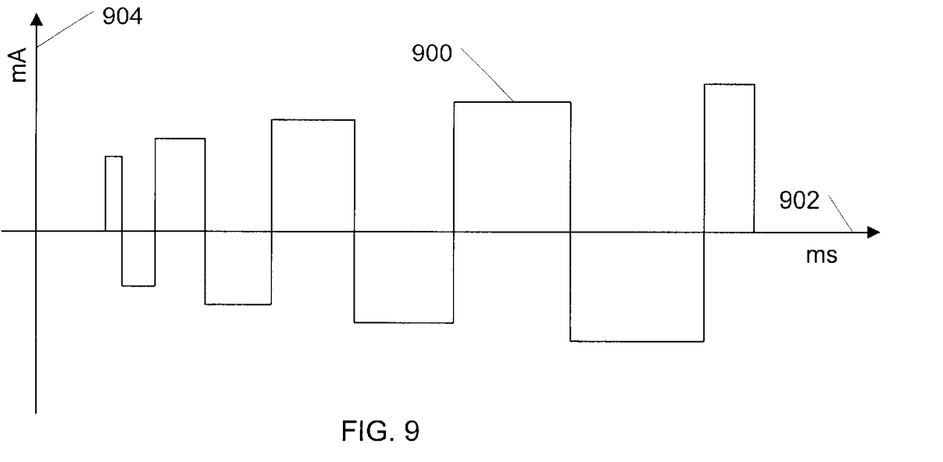
FIG. 9 shows a plot of the current signal into the VCM where the frequency is decreased until the actuator is released from the latched position.

FIG. 9 shows the current profile 900 against an x-axis of time 902 and a y-axis of current 904 in a case where the frequency of the current signal is decreased over time. This is one way of varying the frequency so that it might eventually coincide with the resonant frequency of the actuator at which point less current would be required to unlatch the actuator. In varying the frequency, the method can take advantage of the mechanical resonant characteristics of the actuator without having to determine the resonant frequency beforehand. It follows that the present invention provides a flexible method of unlatching an actuator applicable to different disc drive systems.

Figure 10:
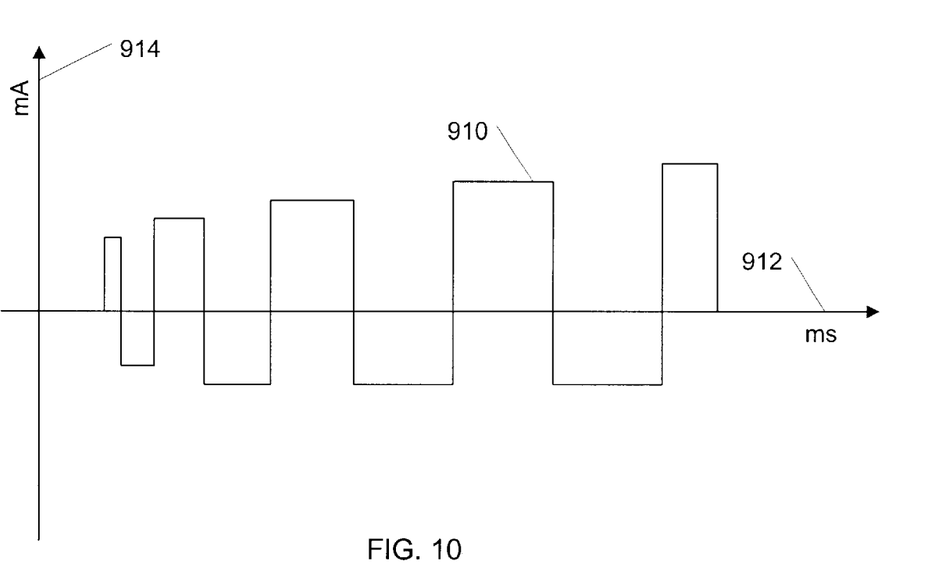
FIG. 10 illustrates a variation of the current profile as shown in FIG. 9 where the second current is subsequently clipped.

Another current profile 910 which is plotted against an x-axis of time 912 and a y-axis of current 914 is shown in FIG. 10. In this case, the second current is signal clipped after an initial increase. When a step current signal is applied, there is inevitably some overshoot. It is desirable to increment the magnitude of the current signal in small steps so that the Back EMF overshoot will be smaller, rather than starting off with a large magnitude for the second current. A smaller Back EMF will take a shorter time to settle, and thus allow for earlier sampling and shorter sampling time. This means that the upper limit of the frequency of the VCM current can be higher than in the case where there is no clipping of the second current signal. The range over which the frequency of the VCM current signal can sweep is thereby improved.

Figure 11:
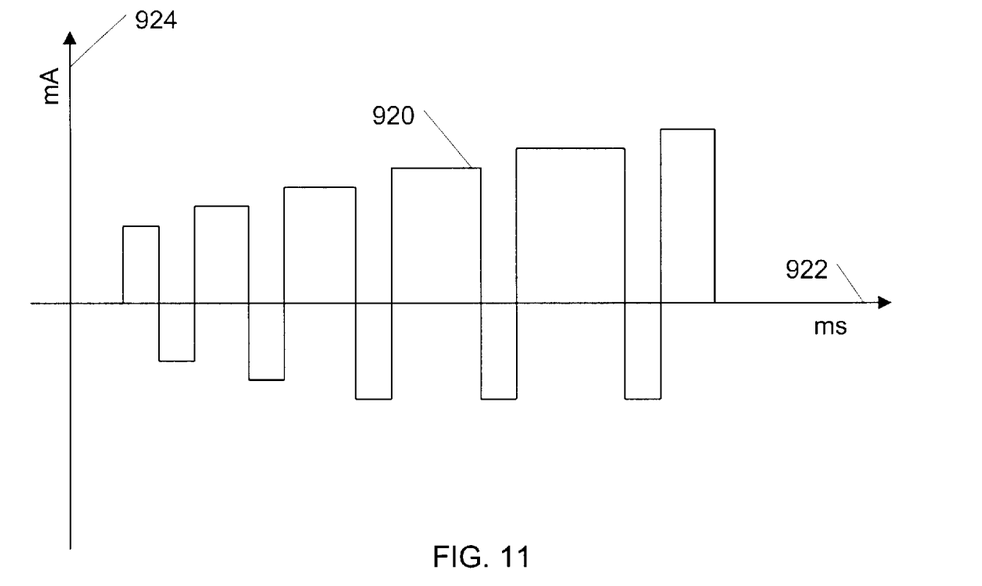
FIG. 11 illustrates a variation of the current profile as shown in FIG. 9 where the period of the second current is kept short and constant.

Another variation of the VCM current profile 920 is shown in FIG. 11 against an x-axis of time 922 and a y-axis of current 924. In this situation, the frequency of the second current signal is kept constant and short since so as to reduce the time required for the unlatching process.

Although the foregoing detailed description illustrates the embodiment where the back EMF of the VCM is used to determine whether the actuator has been unlatched, the present invention is also applicable to systems where a Gray code sensing method is preferred. In such an example, the Gray code is obtained such that the acceleration of the actuator can be constructed from information on the position samples and the corresponding sample time of each sample.

The advantage of using such a Gray code sensing method is that the VCM system which controls the movement of the actuator need not include the two Analog-to-Digital-Converters for reading the back EMF of the VCM. However, there may be cases where the back EMF method is preferred because there is then no necessity to have the Gray code written until close to the latch. The present invention has the advantage of being applicable in these and other possible systems.

Whether the Gray code sensing method is used or the back EMF method is used, the feedback samples need only be taken during each of the first current signal part of the VCM current cycles.

It is to be understood that the foregoing description is only illustrative of various embodiments of the invention, and that changes may be made to the details of structure, function and processes without going beyond the scope of the present invention. For example, the present invention provides for the application of countless possible algorithms which would produce different current profiles to take advantage of different disc drive designs. In another aspect, the present invention is not limited to disc drive systems which use either the back EMF method or the Gray code sensing method to assess when the actuator has been released from the latched position. One skilled in the art will understand that if another method of sensing would perform the required function, use of such a sensor will not depart from the scope of the present invention. In addition, although the preferred embodiments described herein are directed to an apparatus and method for unlatching an actuator in a disc drive system, the present invention is applicable to other systems where a VCM driven actuator needs to overcome a restraining force.

What is claimed is:

1. An apparatus comprising:
   an actuator;
   a voice coil motor operably coupled to the actuator;
   a latch for holding the actuator at a latched position; and
   an unlatching mechanism which is configured to energize the voice coil motor with a first current signal of increasing magnitude alternating with a second current signal out of phase with the first current signal.

2. An apparatus of claim 1 wherein the unlatching mechanism is configured to energize the voice coil motor with the first current signal 180 degrees out of phase to the second current signal.

3. An apparatus of claim 1 wherein the unlatching mechanism is configured to vary the first current signal in frequency.

4. An apparatus of claim 1 wherein the unlatching mechanism is configured to vary the second current signal in frequency.

5. An apparatus of claim 1 wherein the unlatching mechanism is configured to vary the second current signal in magnitude.

6. An apparatus of claim 5 wherein the unlatching mechanism includes a clipping mechanism which is configured to clip the second current signal.

7. An apparatus of claim 1 further comprising a sensor to sense whether the actuator has been released from the latched position.

8. An apparatus of claim 7 wherein the sensor is configured to determine from a sensed back electromagnetic force of the voice coil motor whether the actuator has been released from the latched position.

9. An apparatus of claim 7 wherein the sensor is configured to determine from a sensed Gray code whether the actuator has been released from the latched position.

10. An apparatus of claim 7 wherein the unlatching mechanism is configured to cut off the first current signal to the voice coil motor upon the sensor determining that the actuator is released from the latched position.

11. In a system where a voice coil motor is operably coupled to an actuator which is held by a latch in a latched position, a method of releasing the actuator from the latched position comprising steps of:
   (a) energizing the voice coil motor with a first current signal of increasing magnitude;
   (b) energizing the voice coil motor with a second current signal which is out-of-phase to the first current signal; and
   (c) alternating the first current signal with the second current signal such that the first current signal causes the voice coil motor to urge the actuator away from the latched position, and such that the second current signal causes the voice coil motor to urge the actuator towards the latched position.

12. The method of claim 11 wherein the energizing step (b) further comprises energizing the voice motor with the second current signal 180 degrees out of phase to the first current signal.

13. The method of claim 11 further comprising a step (d) of varying the first current signal in frequency.

14. The method of claim 11 further comprising a step (d) of varying the second current signal in frequency.

15. The method of claim 11 further comprising a step (d) of increasing the second current signal in magnitude.

16. The method according to claim 15 further comprising a step (e) of clipping the second current signal.

17. A method according to claim 11 further comprising a step (d) of sensing whether the actuator has been released from the latched position.

18. The method of claim 17 wherein the sensing step (d) comprises obtaining a back electromagnetic force of the voice coil motor to determine whether the actuator has been released from the latched position.

19. The method of claim 17 as applied to a system with a disc written with Gray code, wherein the sensing step (d) comprises taking a sample of the Gray code to determine whether the actuator has been released from the latched position.

20. A device comprising:
   an actuator;
   a voice coil motor operably coupled to the actuator;
   a latch for holding the actuator at a latched position; and
   unlatching means which energizes the voice coil motor with a first current signal of increasing magnitude alternating with a second current signal.

* * * * *